(12) United States Patent
Wu et al.

(10) Patent No.: US 10,819,074 B2
(45) Date of Patent: Oct. 27, 2020

(54) OVERVOLTAGE PROTECTION CIRCUIT FOR USB CONNECTOR

(71) Applicant: SEMICONDUCTOR COMPONENTS INDUSTRIES, LLC, Phoenix, AZ (US)

(72) Inventors: Eric Wu, Beijing (CN); WeiMing Sun, Beijing (CN); Peng Zhu, Tianjin (CN)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 359 days.

(21) Appl. No.: 15/974,273

(22) Filed: May 8, 2018

(65) Prior Publication Data
US 2019/0348801 A1   Nov. 14, 2019

(51) Int. Cl.
*H02H 9/04* (2006.01)
*H01R 13/66* (2006.01)

(52) U.S. Cl.
CPC ......... *H01R 13/6666* (2013.01); *H02H 9/044* (2013.01); *H02H 9/046* (2013.01)

(58) Field of Classification Search
CPC ...... H01R 13/6666; H02H 9/044; H02H 9/04; H02H 9/046
See application file for complete search history.

(56) References Cited

U.S. PATENT DOCUMENTS

| | | | |
|---|---|---|---|
| 6,946,904 B1* | 9/2005 | Varma | H03K 19/00315 327/321 |
| 10,218,129 B1* | 2/2019 | Mondal | H01R 13/6666 |
| 2009/0109587 A1 | 4/2009 | Smith et al. | |
| 2016/0091940 A1 | 3/2016 | Oh et al. | |
| 2016/0190794 A1 | 6/2016 | Forghani-Zadeh et al. | |
| 2017/0331270 A1* | 11/2017 | Mattos | H02H 3/087 |
| 2017/0346274 A1* | 11/2017 | Nakahara | H02H 9/04 |
| 2019/0267792 A1* | 8/2019 | Li | H02H 9/04 |
| 2019/0319446 A1* | 10/2019 | Mondal | H01R 13/6666 |
| 2020/0136381 A1* | 4/2020 | Wu | H02H 9/045 |

* cited by examiner

*Primary Examiner* — Kyle J Moody
*Assistant Examiner* — Jye-June Lee
(74) *Attorney, Agent, or Firm* — Brake Hughes Bellermann LLP (57) ABSTRACT

According to an aspect, an overvoltage protection circuit includes a bias current generator configured to generate a bias current, and a current comparator configured to receive the bias current and a voltage associated with a data terminal of a connector. The current comparator includes a transistor. The transistor is configured to activate based on a level of the voltage associated with the data terminal. The current comparator is configured to compare a current of the transistor with the bias current. The overvoltage protection circuit includes an output circuit configured to generate an overvoltage protection signal in response to the current of the transistor being greater than the bias current.

20 Claims, 8 Drawing Sheets

OVERVOLTAGE PROTECTION CIRCUIT FOR USB CONNECTOR

TECHNICAL FIELD

This description relates to an overvoltage protection circuit in a universal serial bus (USB) connector that increases the response time for detecting an overvoltage event.

BACKGROUND

Overvoltage protection circuitry protects a device under protection (DUP) from incurring damage during an overvoltage event. For example, when a high voltage is applied on the data terminals of a USB connector, the DUP may incur damage if the switch of the USB connector is activated. Overvoltage protection circuitry detects the voltage level of the data terminals, and generates a signal to turn off the switch when the voltage is greater than a threshold level. In some existing designs, leakage current, response time, and/or so forth may be undesirable for various applications.

SUMMARY

According to an aspect, an overvoltage protection circuit includes a bias current generator configured to generate a bias current, and a current comparator configured to receive the bias current and a voltage associated with a data terminal of a connector. The current comparator includes a transistor. The transistor is configured to activate based on a level of the voltage associated with the data terminal. The current comparator is configured to compare a current of the transistor with the bias current. The overvoltage protection circuit includes an output circuit configured to generate an overvoltage protection signal in response to the current of the transistor being greater than the bias current.

According to some aspects, the overvoltage protection circuit may include one or more of the following features (or any combination thereof). The overvoltage protection circuit may include a reference voltage generator configured to generate a reference voltage. The transistor may activate based on the voltage associated with the data terminal being greater than a combination of the reference voltage and a threshold voltage of the transistor. The overvoltage protection circuit may include a clamp circuit configured to receive the voltage associated with the data terminal, and, in response to the voltage being greater than an upper threshold, the clamp circuit may clamp the voltage to the upper threshold. The overvoltage protection circuit may include a clamp circuit configured to receive the voltage associated with the data terminal, and, in response to the voltage being lower than a lower threshold, the clamp circuit may clamp the voltage to the lower threshold. The transistor may be a first transistor, and the current comparator may include a second transistor and an output node disposed between the first transistor and the second transistor. A voltage may be generated at the output node in response to a current of the first transistor being greater than a current of the second transistor, and the current of the second transistor may be the bias current. The first transistor may be a P-channel transistor, and the second transistor may be an N-channel transistor. The output node may be connected to the output circuit. The transistor has a first terminal configured to receive a reference voltage, a second terminal configured to receive an output of a clamp circuit, and a third terminal connected to a current mirror that mirrors the bias current. The output circuit may include a first inverter and a second inverter.

According to an aspect, a universal serial bus (USB) connector includes a data terminal, and a switch coupled to the data terminal. The switch is configured to be coupled to a device. The data terminal is configured to be electrically connected to the device in response to the switch being closed, and the data terminal is configured to be electrically disconnected from the device in response to the switch being open. The USB connector includes an overvoltage protection circuit connected to the switch. The overvoltage protection circuit is configured to generate an overvoltage protection signal in response to an overvoltage event on the data terminal. The switch is configured to open in response to the overvoltage protection signal. The overvoltage protection circuit includes a bias current generator configured to generate a bias current, and a current comparator. The current comparator includes a transistor. The overvoltage protection circuit is configured to generate the overvoltage protection signal in response to a current of the transistor being greater than the bias current.

According to some aspects, the USB connector may include one or more of the following features (or any combination thereof). The overvoltage protection circuit may include a reference voltage generator configured to generate a reference voltage, where the transistor is configured to activate based on the voltage associated with the data terminal being greater than a combination of the reference voltage and a voltage threshold of the transistor. The overvoltage protection circuit may include a clamp circuit configured to receive a voltage associated with the data terminal, and, in response to the voltage being greater than an upper threshold, the clamp circuit is configured to clamp the voltage to the upper threshold. The clamp circuit may include a first diode and a second diode. The overvoltage protection circuit may include a clamp circuit configured to receive a voltage associated with the data terminal, and, in response to the voltage being lower than a lower threshold, the clamp circuit is configured to clamp the voltage to the lower threshold. The transistor may be a first transistor, the current comparator may include a second transistor and an output node disposed between the first transistor and the second transistor, and a voltage is generated at the output node in response to a current of the first transistor being greater than a current of the second transistor. The first transistor has a gate configured to receive a reference voltage, a source configured to receive the voltage associated with the data terminal, and a drain connected to a drain of the second transistor.

According to an aspect, a method for overvoltage protection in a universal serial bus (USB) connector includes clamping a voltage of a data terminal of the USB connector, activating a first transistor of a current comparator based on the clamped voltage, comparing a current of the first transistor with a current of a second transistor of the current comparator, generating an overvoltage protection signal in response to the current of the first transistor being greater than the current of the second transistor, and deactivating a USB switch based on the overvoltage protection signal.

According to some aspects, the method may include one or more of the following features (or any combination thereof). The method may include generating a reference voltage, and the activating includes activating the first transistor in response to the clamped voltage being greater than a combination of the reference voltage and a voltage threshold of the first transistor. The method may include generating a bias current, and mirroring the bias current with the second transistor. The comparing may include generating a voltage at an output node disposed between the first transistor and the second transistor in the response to the current of the first transistor being greater than the current of the second transistor, and generating the overvoltage protection signal based on the voltage at the output node.

The details of one or more implementations are set forth in the accompanying drawings and the description below. Other features will be apparent from the description and drawings, and from the claims.

DETAILED DESCRIPTION

The present disclosure relates to an overvoltage protection circuit in a universal serial bus (USB) connector that increases the response time for detecting an overvoltage event. In some examples, a USB switch may have a high direct current (DC) tolerance. However, despite the relatively high tolerance of the USB switch, the overvoltage protection circuit discussed herein can quickly detect the voltage of the data terminals while reducing (or eliminating) leakage current on the data terminals. When the overvoltage event is detected faster, the overvoltage protection circuit may timely turn off the USB switch, thereby protecting the connected device. The overvoltage protection circuit discussed herein includes a current comparator that can detect whether a current exceeds a threshold to determine whether there is an overvoltage event on the data terminals in a manner that is faster than conventional approaches (which may use a voltage comparator). Accordingly, the overvoltage protection circuits described herein may have relatively low leakage current on the input/output terminals and a fast response time. The USB connectors described herein can be configured to handle relatively high voltages while keeping the leakage current and maintaining a desirable, fast response time.

Figure 1:
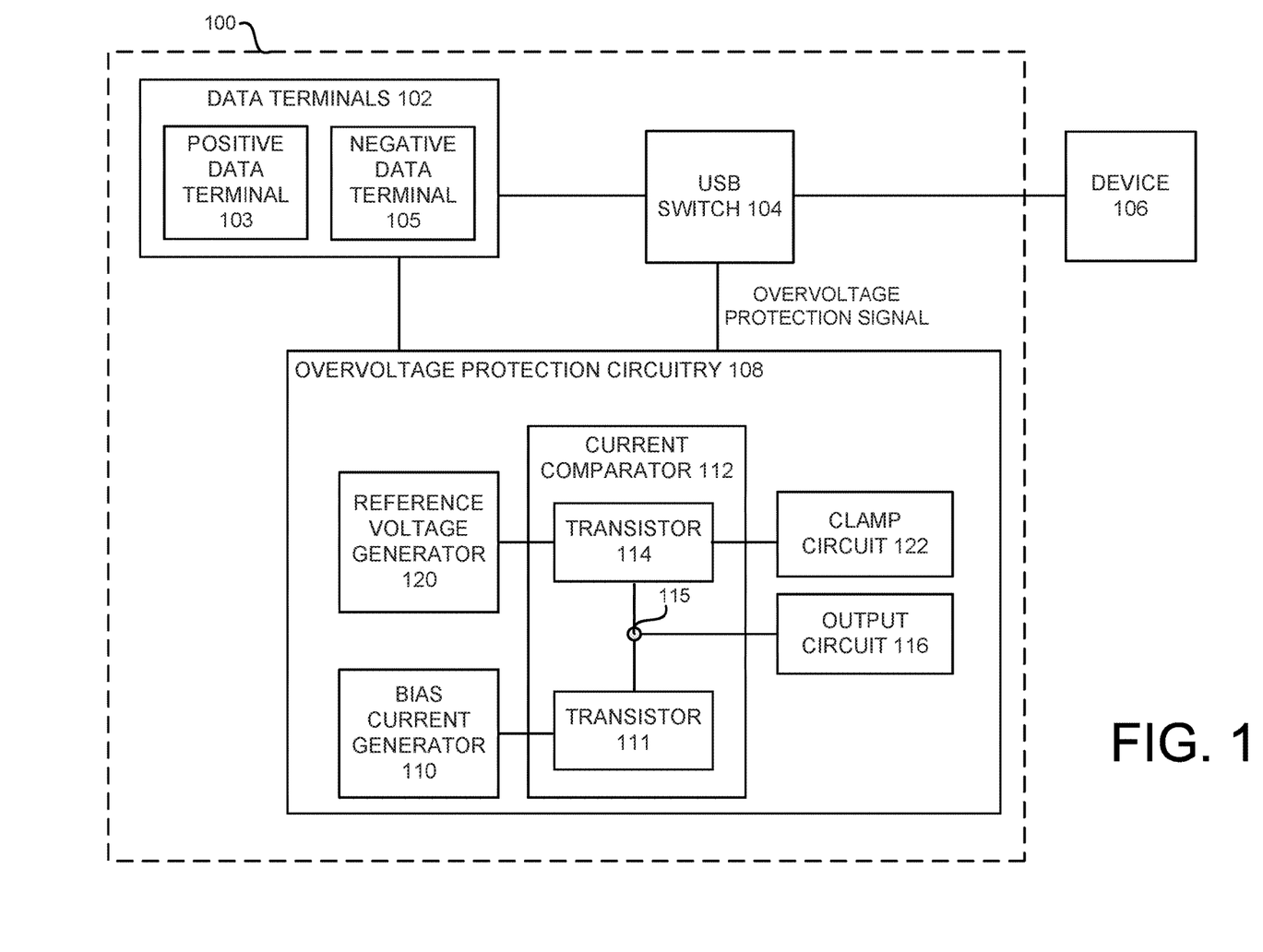
FIG. 1 illustrates an overvoltage protection circuit for a USB connector according to an aspect.

FIG. 1 illustrates an overvoltage protection circuit 108 for a USB switch 104 that provides protection for data terminals 102 in a USB connector 100 according to an aspect. A device 106 (also referred to as the device under protection (DUP)) may be connected to the USB connector 100. The device 106 may be any type of computing device or electronic device capable of connecting to the USB connector 100. The data terminals 102 include a positive data terminal 103 and a negative data terminal 105. In some examples, the positive data terminal 103 is a data plus (DP) pin or line. In some examples, the positive data terminal 103 is a high speed data plus (HSDP) pin or line. In some examples, the negative data terminal 105 is a data minus (DM) pin or line. In some examples, the negative data terminal 105 is a high speed data minus (HSDM) pin or line. In the closed position (or turned-on position), the USB switch 104 provides a connection between the data terminals 102 and the device 106. However, in response to an overvoltage event on the data terminals 102, the USB switch 104 is configured to transition to an open position (or turned-off position) in order to disconnect the data terminals 102 from the device 106 in order to protect the device 106 from incurring damage.

The overvoltage protection circuit 108 is connected to the USB switch 104. In some examples, the USB switch 104 includes a field-effect transistor (FET). In some examples, the USB switch 104 includes a metal-oxide-semiconductor field-effect transistor (MOSFET), a bipolar junction transistor (BJT), or another type of switch device. In some examples, the USB switch 104 includes a transistor (e.g., an N-type (N-channel) transistor). In some examples, the output of the overvoltage protection circuit 108 is connected to a control mechanism (e.g., the gate) of the USB switch 104. The overvoltage protection circuit 108 is also connected to the data terminals 102. The overvoltage protection circuit 108 is configured to receive the voltage on the positive data terminal 103 and/or the voltage on the negative data terminal 105.

The overvoltage protection circuit 108 is configured to generate an overvoltage protection signal based on the voltage of the positive data terminal 103 and/or the voltage of the negative data terminal 105, and output the overvoltage protection signal to the USB switch 104. The overvoltage protection signal indicates the occurrence of an overvoltage event on the data terminals 102. In some examples, the overvoltage protection signal is a transition from a first logic level to a second logic level (e.g., logic low to logic high, or logic high to logic low). In response to the overvoltage protection signal, the USB switch 104 is configured to transition from the closed position to the open position, thereby protecting the device 106 from the high voltage during the overvoltage event.

In some examples, the USB switch 104 has a relatively high tolerance (or relatively large operating range). For example, the tolerance of the USB switch 104 may be defined by an upper threshold and a lower threshold. In some examples, the USB switch 104 has a tolerance between ±10V and ±30V. In some examples, the tolerance of the USB switch 104 is ±20V (e.g., the upper threshold being 20V, and the lower threshold being −20V). In some examples, the tolerance of the USB switch 104 is ±24V. In some examples, the tolerance of the USB switch 104 is ±30V. However, despite the greater tolerance of the USB switch 104, the overvoltage protection circuit 108 can quickly detect the voltage of the data terminals 102 while reducing (or eliminating) leakage current. When the overvoltage event is detected faster, the overvoltage protection circuit 108 may timely turn off the USB switch 104 (e.g., transition to the open position), thereby protecting the device 106. In addition, the overvoltage protection circuit 108 may reduce the voltage level on the USB connector 100, which can further protect the device 106.

The overvoltage protection circuit 108 includes a reference voltage generator 120, a bias current generator, 110, a current comparator 112, a clamp circuit 122, and an output circuit 116. The current comparator 112 includes a transistor 114, a transistor 111, and an output node 115. In some examples, the transistor 114 is a P-channel transistor. In some examples, the transistor 111 is an N-channel transistor. The transistor 111 is connected to the transistor 114, and the output node 115 is disposed between the transistor 114 and the transistor 111.

The current comparator 112 may compare the current of the transistor 114 with the current of the transistor 111. The current of the transistor 114 may indicate a level of voltage on the data terminals 102 (e.g., the greater the current, the higher the voltage). In some examples, the current of the transistor 114 is the drain current of the transistor 114. In some examples, the current of the transistor 111 is the drain current of the transistor 111. In some examples, the current of the transistor 111 is a bias current generated by the bias current generator 110. In some examples, the transistor 111 may operate as a current mirror that copies the bias current generated by the bias current generator 110. If the current of the transistor 114 is greater than the current of the transistor 111, a voltage is produced at the output node 115. In response to the voltage at the output node 115, the output circuit 116 may output the overvoltage protection signal to the USB switch 104. By using the current comparator 112, the detection of an overvoltage event may be detected faster than conventional approaches.

An input of the clamp circuit 122 may be connected to the data terminals 102. For example, the clamp circuit 122 may receive the voltage of the positive data terminal 103 and the negative data terminal 105. The clamp circuit 122 may clamp the voltage of the data terminals 102 to a specified range. For example, since the USB switch 104 has a relatively large tolerance, the voltage on the data terminals 102 may be relatively high (e.g., 20V). However, the current comparator 112 may include low-power devices (e.g., transistor 114, transistor 111). Accordingly, the clamp circuit 122 may clamp the voltage of the data terminals 102 to fall within a lower voltage range. In some examples, the output voltage range of the clamp circuit 122 is about 0V to 6V. For example, in response to the voltage of the data terminals 102 being greater than an upper threshold, the clamp circuit 122 may clamp the voltage to the upper threshold. For instance, if the upper threshold is 6V and the voltage of the data terminals 102 is 20V, the clamp circuit 122 may clamp the voltage to 6V. In response to the voltage of the data terminals 102 being less than a lower threshold, the clamp circuit 122 may clamp the voltage to the lower threshold. For instance, if the lower threshold is 0V and the voltage of the data terminals 102 is −20V, the clamp circuit 122 may clamp the voltage to 0V. In this manner, the voltages remain within a safe operating range of the components of the current comparator 112.

The output of the clamp circuit 122 may be connected to the transistor 114 of the current comparator 112. For example, the transistor 114 may receive the voltage (or clamped voltage) of the data terminals 102. In some examples, the output of the clamp circuit 122 may be connected to the source of the transistor 114.

The reference voltage generator 120 is configured to generate and output a reference voltage. The output of the reference voltage generator 120 may be connected to the transistor 114. In some examples, the output of the reference voltage generator 120 may be connected to the gate of the transistor 114. In some examples, when the voltage (or clamped voltage) of the data terminals 102 (e.g., the source voltage of the transistor 114) is greater than a combination of the reference voltage (e.g., the gate voltage of the transistor 114) and the threshold voltage of the transistor 114, the transistor 114 activates (or turns-on) which produces the current (e.g., drain current) of the transistor 114. The current of the transistor 114 is compared against the bias current (or the current of the transistor 111). If the current of the transistor 114 is greater than the current of the transistor 111, a voltage is produced at the output node 115.

The output circuit 116 may generate the overvoltage protection signal based on the voltage produced at the output node 115. In some examples, the output circuit 116 may include one or more logic gates. In some examples, the output circuit 116 may include one or more buffers. In some examples, the output circuit 116 may include one or more amplifiers. In some examples, the output circuit 116 may include one or more inverters. In some examples, the output circuit 116 may include a first inverter and a second inverter connected in series.

Figure 2:
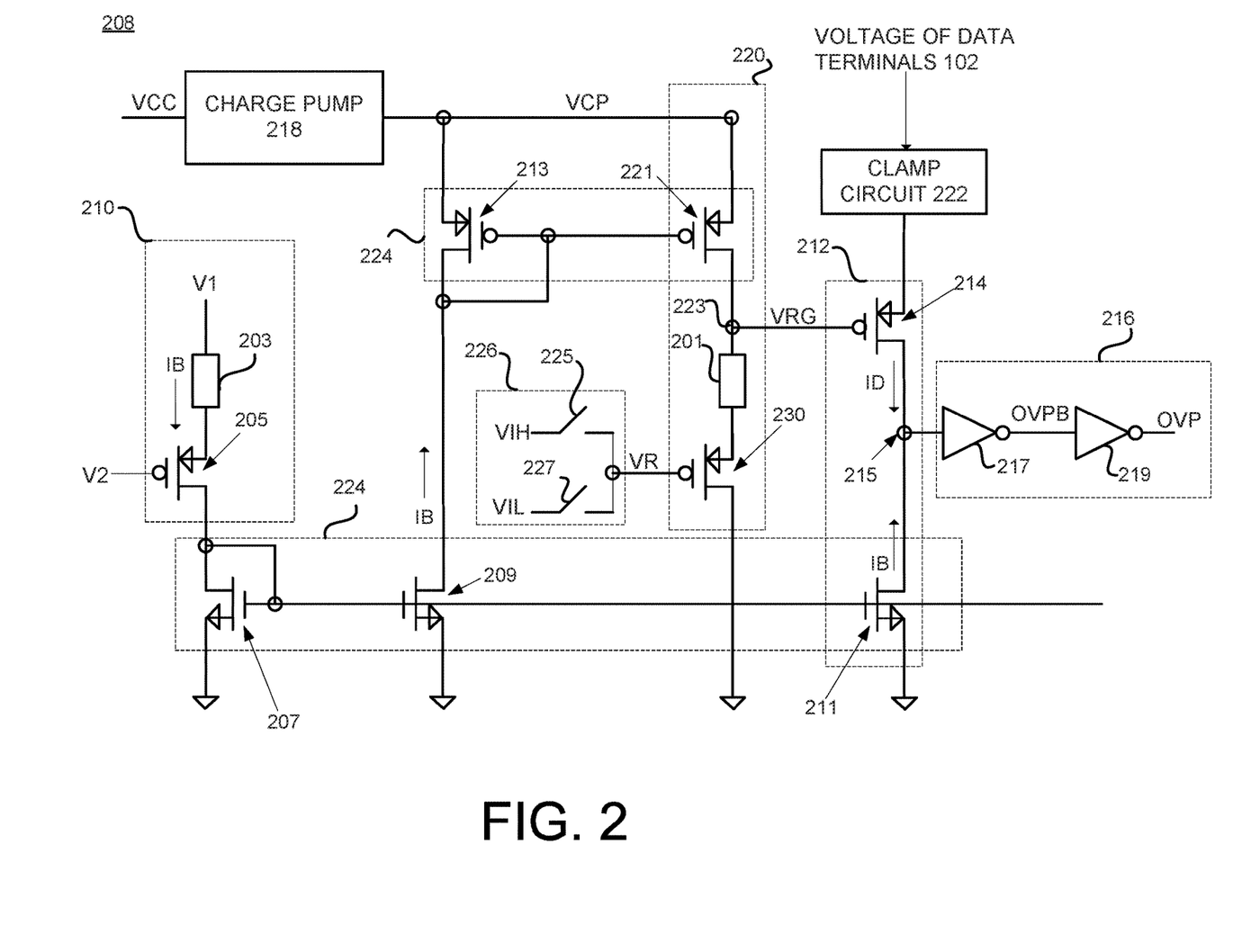
FIG. 2 illustrates an overvoltage protection circuit according to another aspect.

FIG. 2 illustrates an overvoltage protection circuit 208 according to an implementation. The overvoltage protection circuit 208 shown in FIG. 2 can be an example of the overvoltage protection circuit 108 shown in FIG. 1. In some examples, the overvoltage protection circuit 208 may include any of the features discussed with reference to FIG. 1. The overvoltage protection circuit 208 is configured to generate an overvoltage protection signal OVP based on the voltage of the data terminals 102, and output the overvoltage protection signal OVP to a USB switch (e.g., the USB switch 104 of FIG. 1). The overvoltage protection signal OVP indicates the occurrence of an overvoltage event on data terminals of a USB connector (e.g., the data terminals 102 of FIG. 1). In response to the overvoltage protection signal OVP, the USB switch transitions from the closed position to the open position, thereby protecting the device under protection (e.g., the device 106 of FIG. 1) during the overvoltage event.

The overvoltage protection circuit 208 includes a charge pump 218, a bias current generator 210, a reference voltage generator 220, a hysteresis voltage adjustor 226, a current comparator 212, a clamp circuit 222, a current mirror 224, and an output circuit 216.

The current comparator 212 is configured to detect whether a current ID exceeds a threshold (bias current IB) in order to determine an overvoltage event in a manner that is faster than conventional approaches. The current comparator 212 includes a transistor 214 and a transistor 211. The transistor 211 is connected to the transistor 214. The current comparator 212 includes an output node 215 disposed between the transistor 214 and the transistor 211.

The transistor 214 may be a P-channel transistor. The transistor 211 may be an N-channel transistor. The transistor 211 may be also considered part of the current mirror 224. For example, the transistor 211 is configured to mirror (or copy) the bias current IB generated by the bias current generator 210. The current comparator 212 is configured to compare the current ID with the current through the transistor 211 (the bias current IB), and when the current ID is greater than the bias current IB, the output node 215 is configured to produce a voltage, which may cause the overvoltage protection signal OVP to transition to a logic high state indicating an overvoltage event on the data terminals (e.g. the data terminals 102 of FIG. 1). The gate of the transistor 214 is configured to receive a reference voltage VRG generated by the reference voltage generator 220. The source of the transistor 214 is configured to receive the output of the clamp circuit 222. The drain of the transistor 214 is connected to the output node 215. The drain of the transistor 211 is connected to the output node 215. The source of the transistor 211 is connected to ground.

The bias current generator 210 is configured to generate the bias current IB, which current biases the output node 215 via the current mirror 224. The bias current generator 210 includes a resistor 203 and a transistor 205. In some examples, the transistor 205 includes a P-channel transistor. The resistor 203 may have a first terminal connected to a first voltage V1 and a second terminal connected to the transistor 205. The gate of the transistor 205 is connected to a second voltage V2. The source of the transistor 205 is connected to the second terminal of the resistor 203. The drain of the transistor 205 is connected to the current mirror 224. In some examples, the configuration of the bias current generator 210 is configured to generate the bias current IB based on the following equation:

$$\text{Bias Current } IB=(V1-V2-Vthp)/R1. \quad \text{Eq. (1):}$$

V1 is the first voltage, V2 is the second voltage, Vthp is the threshold voltage of the transistor 205, and R1 is the value of the resistor 203.

The current mirror 224 is configured to mirror the bias current IB. For example, the current mirror 224 is configured to copy (or mirror) the bias current IB generated by the bias current generator 210. The current mirror 224 may include a transistor 207, a transistor 209, a transistor 211, a transistor 213, and a transistor 221. Each of the transistor 207, the transistor 209, the transistor 211, the transistor 213, and the transistor 221 is configured to mirror the bias current IB. In some examples, the gain of the transistor 207, the transistor 209, and the transistor 211 is one (e.g., if the bias current IB is lamp, the current through each of these transistors is lamp). The transistor 207 may be an N-channel transistor. The transistor 209 may be an N-channel transistor. The transistor 211 may be an N-channel transistor. The drain of the transistor 207 is connected to the drain of the transistor 205. The source of the transistor 207 is connected to ground. The gate of the transistor 207 is connected to the drain of the transistor 207. The gate of the transistor 209 is connected to the gate of the transistor 207. The source of the transistor 209 is connected to ground. The drain of the transistor 209 is connected to the drain of the transistor 213. The gate of the transistor 211 is connected to the gate of the transistor 207. The source of the transistor 211 is connected to ground. The drain of the transistor 211 is connected to the output node 215.

The reference voltage generator 220 is configured to generate a reference voltage VRG, which is provided to the gate of the transistor 214 of the current comparator 212. The reference voltage generator 220 may include the transistor 221, an output node 223, a resistor 201, and a transistor 230. The transistor 221 may be a P-channel transistor. The transistor 230 may be a P-channel transistor. The source of the transistor 221 is connected to the output of the charge pump 218 (voltage VCP). The gate of the transistor 221 is connected to the transistor 213. As indicated above, the transistor 213 is part of the current mirror 224 that mirrors the bias current IB. The gain of the transistor 213 may be one. Also, the transistor 221 is part of the current mirror 224 that mirrors the bias current IB. In some examples, the gain of the transistor 221 is two.

The drain of the transistor 221 is connected to the output node 223. The resistor 221 has a first terminal connected to the output node 223, and a second terminal connected to the transistor 230. The source of the transistor 230 is connected to the second terminal of the resistor 201. The drain of the transistor 230 is connected to ground. The gate of the transistor 230 is connected to voltage VR, which is the output of the hysteresis voltage adjustor 226.

In some examples, the configuration of the reference voltage generator 220 is configured to generate the reference voltage VRG based on the following equation:

$$\text{Reference Voltage } VRG=VR+Vthp2+2*R2*(V1-V2-Vthp)/R1). \quad \text{Eq. (2):}$$

VR is the output voltage of the hysteresis voltage adjustor 226, Vthp2 is the threshold voltage of the transistor 230, and R2 is the value of the resistor 201. The parameter (V1−V2−Vthp)/R1 is the bias current IB (explained above), which is multiplied by two (e.g., the transistor 221 functions as part of the current mirror 224 with a gain of two).

The charge pump 218 is configured to receive a supply voltage VCC and generate a voltage VCP that is used within the overvoltage protection circuit 208. In some examples, the overvoltage protection circuit 208 may need a voltage higher than the supply voltage. In these cases, the voltage VCP is higher than the supply voltage VCC.

The clamp circuit 222 is configured to receive the voltage associated with the data terminals 102 of FIG. 1, and limit (or clamp) the voltage to a specified range. For example, the voltage on the data terminals 102 of FIG. 1 may range from a first voltage (e.g., 20V) to a second voltage (e.g., −20V) as provided by the tolerance of the USB switch 104 of FIG. 1. However, the voltage on the data terminals 102 of FIG. 1 may exceed the safe operating range of the transistor 214 of the current comparator 212. For example, the transistor 214 may be a low-voltage device. The clamp circuit 222 is configured to limit the voltage to fall within a range (e.g., 0V to 6V) that is smaller than the range allowed on the data terminals 102 of FIG. 1. The specified range may include an upper threshold and a lower threshold. The upper threshold may be less than the first voltage, and the lower threshold may be greater than the second voltage. For example, in response to the DP's voltage being greater than an upper threshold, the clamp circuit 222 is configured to clamp the DP's voltage to the upper threshold.

In one example, if the upper threshold voltage is 6V, and the DP's voltage is 10V, the clamp circuit 222 is configured to output 6V. In response to the DM's voltage being lower than the lower threshold, the clamp circuit 222 is configured to clamp the DM's voltage to the lower threshold. In one example, if the lower threshold voltage is 0V, and the DM's voltage is −10V, the clamp circuit 222 is configured to output 0V. In some examples, for a USB application, a normal operating voltage range for both the DP and DM terminals may be 0V to 3.6V. However, in some examples, the overvoltage protection circuit 208 can operate with the DP's voltage across a range of −30V to 30V, and the DM's voltage across a range of −30V to 30V.

With respect to the operations of the current comparator 212, the transistor 214 activates based on a level of the output of the clamp circuit 222. For example, the transistor 214 activates in response to the output of the clamp circuit 222 being greater than VRG (reference voltage)+Vthp3 (threshold voltage of the transistor 214), which produces the current ID through the transistor 214 (also referred to as a drain current). The current comparator 212 is configured to compare the current ID with the current of the transistor 211 (the bias current IB). For instance, the voltage at the output node 215 is determined by a current difference between the drain current of the transistor 214 and the drain current of the transistor 211.

The output circuit 216 is configured to amplify the voltage at the output node 215. The output circuit 216 may include a first inverter 217 and a second inverter 219. The first inverter 217 has an input connected to the output node 215, and an output connected to an input of the second inverter 219. The output of the first inverter 217 is an intermediate signal OVPB, and the output of the second inverter 219 is the overvoltage protection signal OVP. In some examples, a logic high state of the overvoltage protection signal OVP indicates an overvoltage event. For example, the overvoltage protection signal OVP transitioning from the logic low to the logic high indicates the overvoltage event. In some examples, the output circuit 216 is connected to the USB switch 104 of FIG. 1. When the overvoltage protection signal OVP is the logic high, the USB switch 104 of FIG. 1 is moved to the open position, thereby disconnecting the device 106 of FIG. 1 from the data terminals 102 of FIG. 1.

The hysteresis voltage adjustor 226 is configured to adjust the hysteresis voltage of the overvoltage protection circuit 208. For example, the hysteresis voltage adjustor 226 is configured to adjust the voltage VR, which is used to generate the reference voltage VRG. The hysteresis voltage adjustor 226 includes a first switch 225 and a second switch 227. When the first switch 225 is in the closed position, a voltage input high VIH is used as the voltage VR (e.g., the voltage provided to the gate of the transistor 230). The first switch 225 is controlled by the intermediate signal OVPB. For instance, the transitioning of the intermediate signal OVPB from a first logic state to a second logic state closes the first switch 225 to connect the voltage input high VIH to the gate of the transistor 230. When the second switch 227 is in the closed position, a voltage input low VIL is used as the voltage VR (e.g., the voltage provided to the gate of the transistor 230). The second switch 227 is controlled by the overvoltage protection signal OVP. For instance, the transitioning of the overvoltage protection signal OVP from a first logic state to a second logic state closes the second switch 227 to connect the voltage input low VIL to the gate of the transistor 230. The voltages VIL and VIH may specify the center voltage or current inputs about which the hysteresis effect operates.

Figure 3:
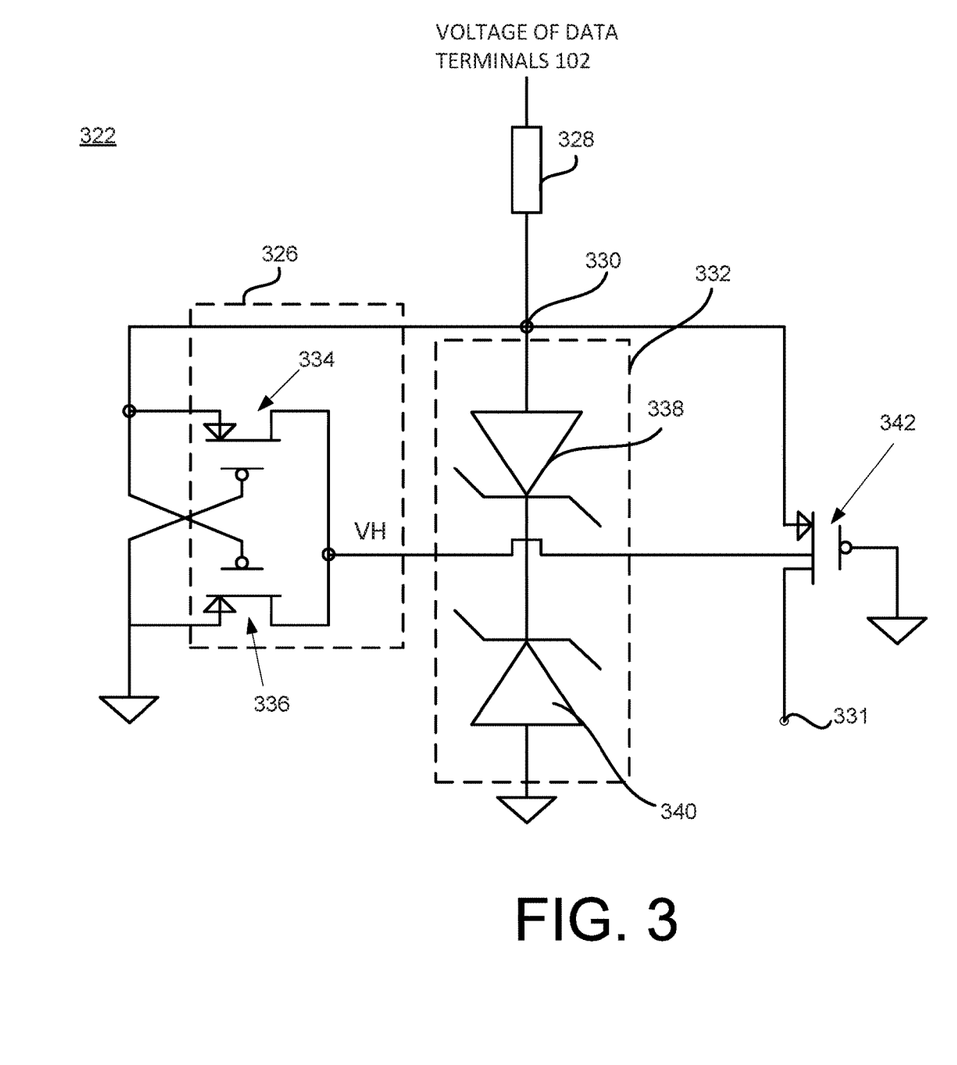
FIG. 3 illustrates a clamp circuit of the overvoltage protection circuit of FIG. 1 or 2 according to an aspect.

FIG. 3 illustrates an example of a clamp circuit 322 according to an aspect. The clamp circuit 322 may be an example of the clamp circuit 122 of FIG. 1 or the clamp circuit 222 of FIG. 2. The clamp circuit 322 may include a resistor 328, a node 330, a voltage bias circuit 326, a diode circuit 332, a transistor 342, and an output node 331. The resistor 328 includes a first terminal connected to the data terminals 102 of FIG. 1, and a second terminal connected to the node 330. In some examples, the output node 331 is connected to the source of the transistor 214 of FIG. 2. The resistor 328 may be used to clamp the current of the data terminals 102. In some examples, the output voltage range of the clamp circuit 322 is about 0V to 6V. In some examples, the voltage range of the node 330 is from about −6V to 6V, but the voltage range of the output node 331 is from about 0V to 6V.

The voltage bias circuit 326 is configured to generate a voltage high VH to bias the bulk of the transistor 342. The voltage bias circuit 326 includes a transistor 334 and a transistor 336. The transistor 334 may be a P-channel transistor. The transistor 336 may be a P-channel transistor. The diode circuit 332 is configured to clamp the voltage of the node 330 to a range (e.g., −6V to 6V). The diode circuit 332 includes a first diode 338 and a second diode 340. In some examples, the first diode 338 is a Zener diode. In some examples, the second diode 340 is a Zener diode. The anode of the first diode 338 is connected to the node 330, and the cathode of the first diode 338 is connected to the cathode of the second diode 340. The anode of the second diode 340 is connected to ground.

The transistor 342 is configured to remove the safe operating area (SOA) warning of one or more components of the current comparator 212 of FIG. 2. In some examples, the transistor 342 includes a P-channel transistor. The source of the transistor 342 is connected to the node 330. The drain of the transistor 342 is connected to the output node 331. The gate of the transistor 342 is connected to ground. The output node 331 is connected to the current comparator 212 of FIG. 2. When the voltage on the data terminals 102 is relatively low (e.g., low as −20V), the clamp circuit 322 may clamp the voltage on the node 330 to a certain value (e.g., about −6V) using the first diode 338 and the second diode 340. When the voltage on the data terminals 102 is relatively high (e.g., as high as 20V), the clamp circuit 322 may clamp the voltage on the node 330 to a certain value (e.g., about 6V) using the first diode 338 and the second diode 340. Also, the clamp circuit 322 may remove the SOA warning (via the transistor 342).

Figure 4:
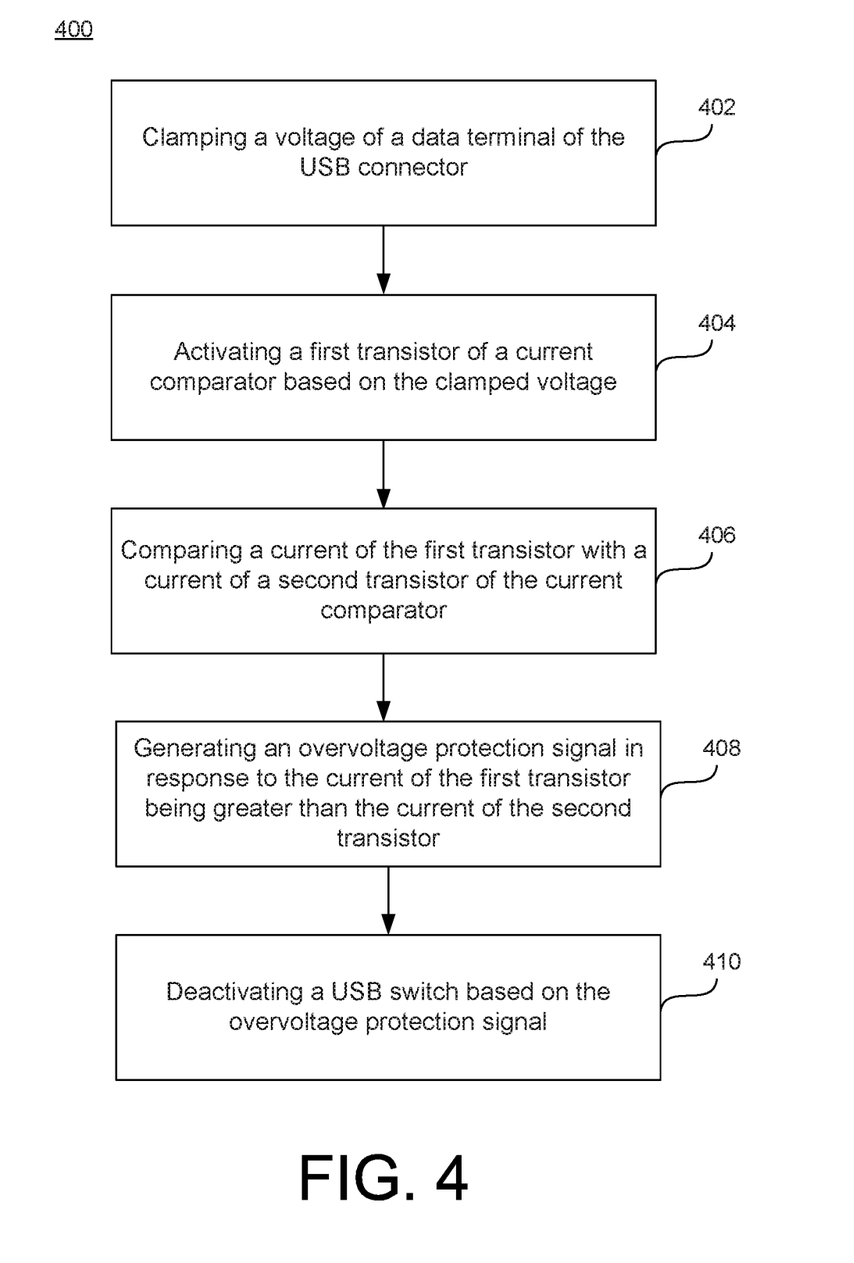
FIG. 4 illustrates a flowchart depicting example operations of overvoltage protection in a USB connector according to an aspect.

FIG. 4 illustrates a flowchart 400 depicting example operations of overvoltage protection in a USB connector according to an aspect. Although the flowchart 400 of FIG. 4 illustrates operations in sequential order, it will be appreciated that this is merely an example, and that additional or alternative operations may be included. Further, operations of FIG. 4 and related operations may be executed in a different order than that shown, or in a parallel or overlapping fashion. The operations of FIG. 4 may be performed by the overvoltage protection circuit 108 of FIG. 1, the USB switch 104 of FIG. 1, the overvoltage protection circuit 208 of FIG. 2, and/or the clamp circuit 322 of FIG. 3.

Operation 402 includes clamping a voltage of a data terminal of the USB connector. For example, a clamp circuit (e.g., the clamp circuit 122, 222, or 322) may receive the voltage of a positive data terminal (e.g., the positive data terminal 103) or a negative data terminal (e.g., the negative data terminal 105). The clamp circuit may clamp the voltage of the data terminals to a specified range.

Operation 404 includes activating a first transistor of a current comparator based on the clamped voltage. For example, a current comparator (e.g., the current comparator 112 or 212) includes a first transistor (e.g., the transistor 114 or 214) and a second transistor (e.g., the transistor 111 or 211). In some examples, the first transistor is a P-channel transistor. In some examples, the second transistor is an N-channel transistor. The first transistor may activate based on the clamped voltage (or a level of the voltage of the data terminals). In some examples, the method also includes generating a reference voltage. For example, a reference voltage generator (e.g., the reference voltage generator 120 or 220) may generate the reference voltage. The first transistor may be activated in response to the clamped voltage (e.g., the output of the clamped circuit) being greater than the combination of the reference voltage and the voltage threshold of the first transistor.

Operation 406 includes comparing a current of the first transistor with a current of the second transistor of the current comparator. For example, the current comparator is configured to compare the current of the first transistor with the current of the second transistor. In some examples, the current comparator is configured to compare a drain current of the first transistor with a drain current of the second transistor. In some examples, the method includes generating a bias current. For example, a bias current generator (e.g., the bias current generator 110 or 210) may generate the bias current. The second transistor may be configured to mirror (or copy) the bias current. A voltage at an output node (e.g., the output node 115 or 215) disposed between the first transistor and the second transistor may be generated in the response to the current of the first transistor being greater than the current of the second transistor. The overvoltage protection signal may be generated based on the voltage at the output node.

Operation 408 includes generating an overvoltage protection signal in response to the current of the first transistor being greater than the current of the second transistor. For example, an output circuit (e.g., the output circuit 116 or 216) may generate and send the overvoltage protection signal to a USB switch (e.g., the USB switch 104).

Operation 410 includes deactivating a USB switch based on the overvoltage protection signal. For example, in response to receiving the overvoltage protection signal, the USB switch may deactivate (e.g., transition to an open state) in order to electrically disconnect the data terminals of the USB connector from the device under protection.

Figure 5A:
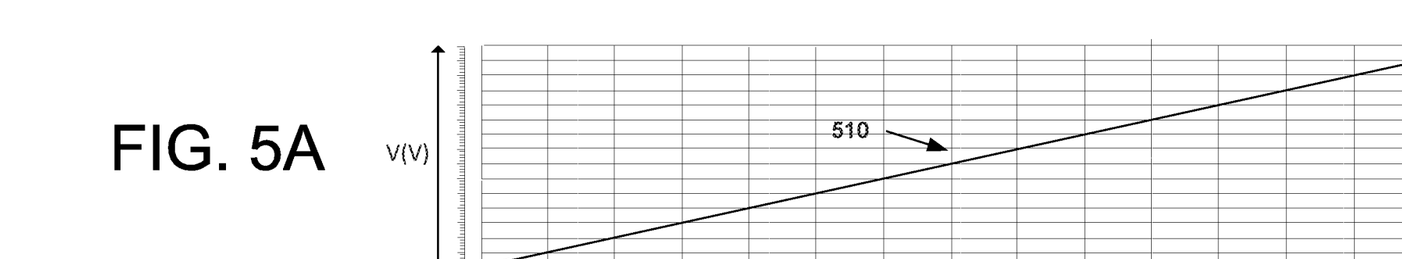
FIGS. 5A through 5C are graphs depicting a hysteresis voltage sweep according to an aspect.
Figure 5B:
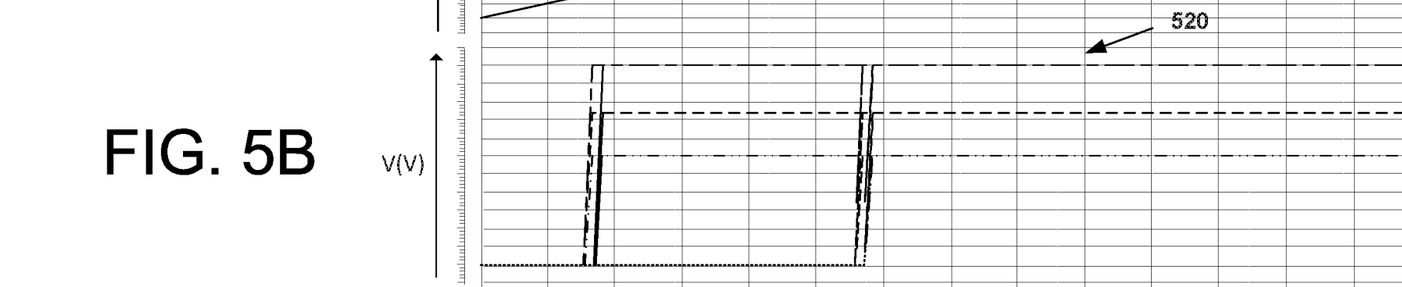
Figure 5C:
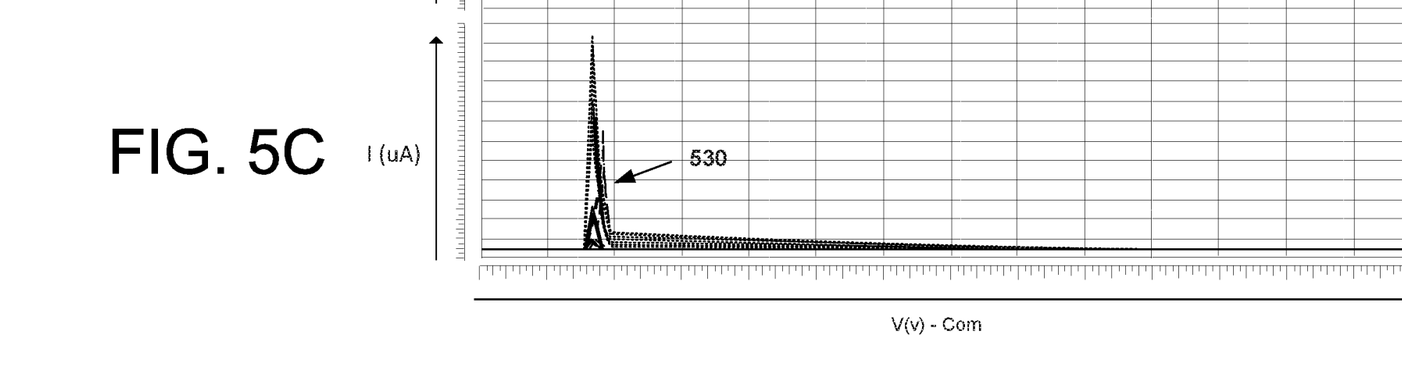

FIGS. 5A through 5C are graphs depicting a hysteresis voltage sweep of the communication terminal from a low voltage to a high voltage according to an aspect. Signal 510 in FIG. 5A shows the voltage of the data terminal (DP/DM) across the voltage sweep. Signal 520 in FIG. 5B shows the voltage of the overvoltage protection signal across the voltage sweep. Signal 530 in FIG. 5C shows the current (or power consumption) of the data terminal across the voltage sweep. As shown in FIGS. 5A through 5C, the current (or power consumption) is relatively low from the low voltage to the high voltage.

Figure 6A:
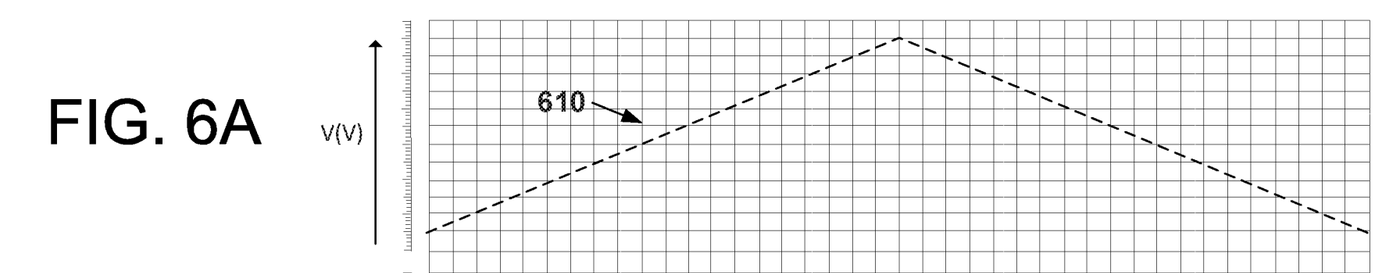
FIGS. 6A through 6C are graphs depicting a simulation to verify the function of an overvoltage protection signal according to an aspect.
Figure 6B:
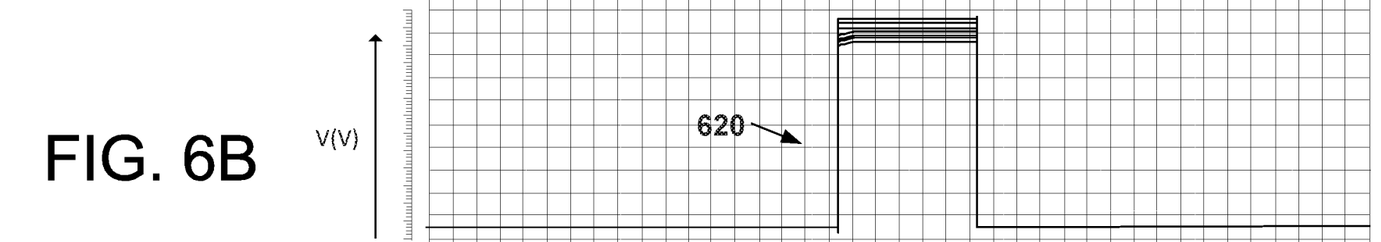
Figure 6C:
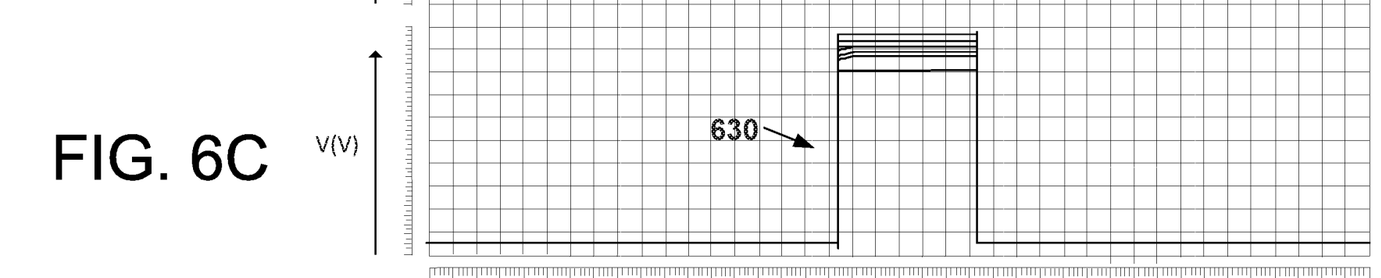

FIGS. 6A through 6C are graphs depicting a simulation to verify the function of the overvoltage protection signal according to an aspect. The graphs depict voltages of the data terminal and overvoltage protection signals over time. Signal 610 in FIG. 6A shows the voltage of the data terminal over time. Signal 620 in FIG. 6B shows the overvoltage protection signal with respect to an overvoltage event on the positive data terminal over time. Signal 630 in FIG. 6C shows the overvoltage protection signal with respect to an overvoltage event on the negative data terminal over time.

Figure 7:
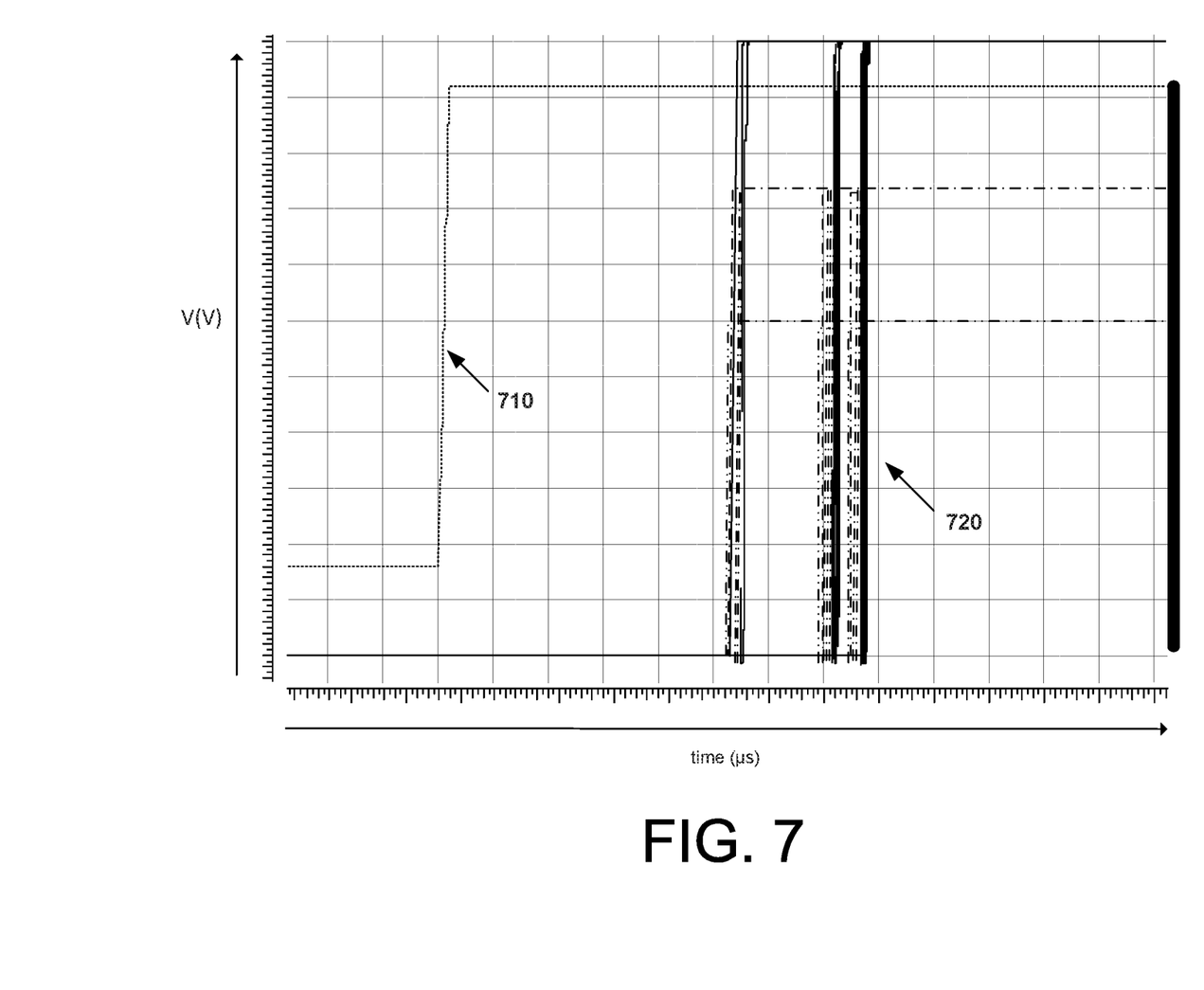
FIG. 7 illustrates a graph depicting a response time of the overvoltage protection signal according to an aspect.

FIG. 7 illustrates a graph depicting a response time of the overvoltage protection signal according to an aspect. Signal 710 shows the voltage of the data terminal over time. Signal 720 shows the overvoltage protection signal over time. As shown in FIG. 7, the response time of the overvoltage protection signal is relatively fast.

Figure 8A:
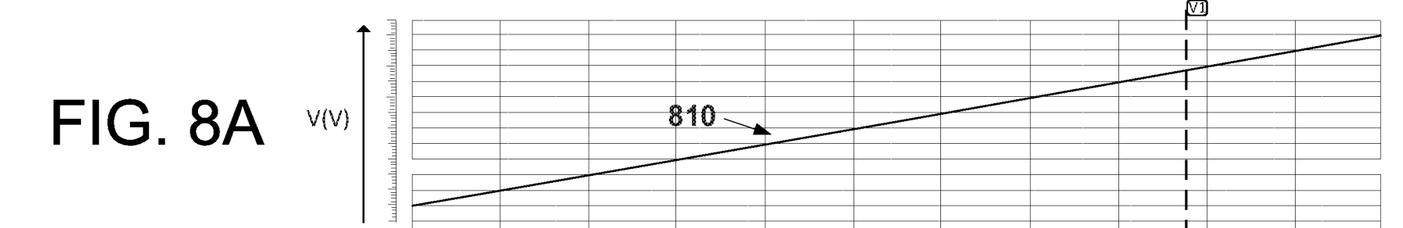
FIGS. 8A through 8C are graphs depicting a voltage sweep to check a leakage current of a data terminal according to an aspect.
Figure 8B:
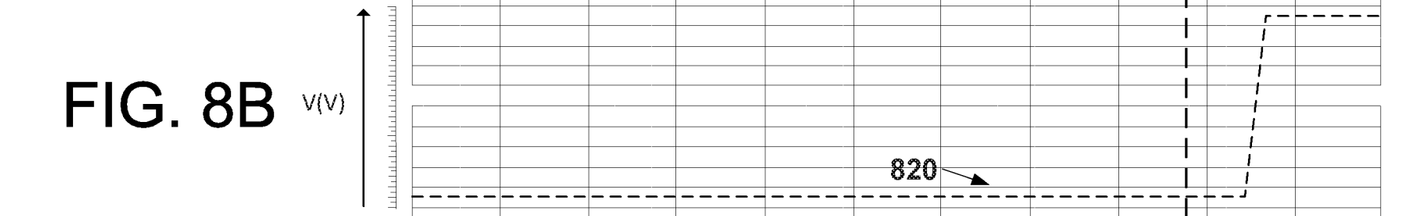
Figure 8C:
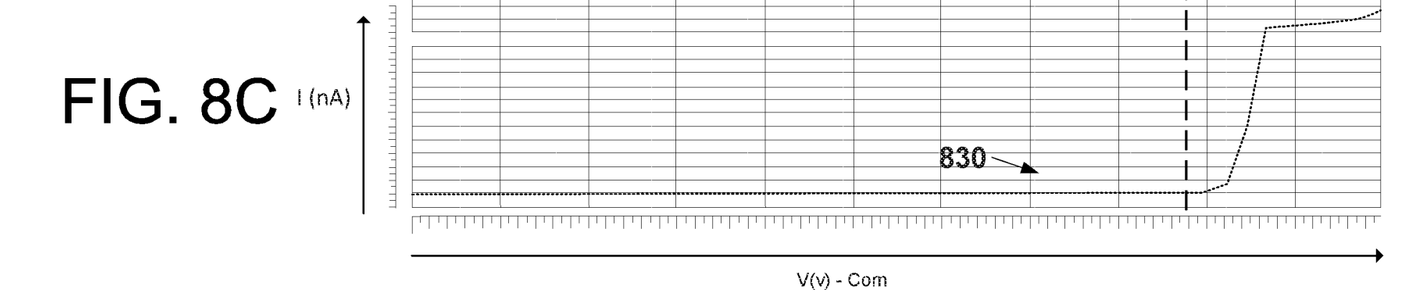

FIGS. 8A through 8C are graphs depicting a voltage sweep of the communication terminal (com) to check the leakage current according to an aspect. Signal 810 in FIG. 8A shows the voltage of the positive data terminal across the sweep. Signal 820 in FIG. 8B shows the overvoltage protection signal across the sweep. Signal 830 in FIG. 8C shows the current of the positive data terminal across the sweep. As shown in FIGS. 8A through 8C, the leakage current on the positive data terminal is relatively low.

It will be understood that, in the foregoing description, when an element is referred to as being connected to, electrically connected to, coupled to, or electrically coupled to another element, it may be directly connected or coupled to the other element, or one or more intervening elements may be present. In contrast, when an element is referred to as being directly connected to or directly coupled to another element, there are no intervening elements. Although the terms directly connected to, or directly coupled to may not be used throughout the detailed description, elements that are shown as being directly connected or directly coupled can be referred to as such. The claims of the application, if any, may be amended to recite exemplary relationships described in the specification or shown in the figures.

Implementations of the various techniques described herein may be implemented in (e.g., included in) digital electronic circuitry, or in computer hardware, firmware, software, or in combinations of them. Portions of methods also may be performed by, and an apparatus may be implemented as, special purpose logic circuitry, e.g., an FPGA (field programmable gate array) or an ASIC (application specific integrated circuit).

Some implementations may be implemented using various semiconductor processing and/or packaging techniques. Some implementations may be implemented using various types of semiconductor processing techniques associated with semiconductor substrates including, but not limited to, for example, Silicon (Si), Gallium Arsenide (GaAs), Gallium Nitride (GaN), Silicon Carbide (SiC) and/or so forth.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. An overvoltage protection circuit, comprising:
    a bias current generator configured to generate a bias current;
    a current comparator configured to receive the bias current and a voltage associated with a data terminal of a connector, the current comparator including a transistor, the transistor configured to activate based on a level of the voltage associated with the data terminal, the current comparator configured to compare a current of the transistor with the bias current; and
    an output circuit configured to generate an overvoltage protection signal in response to the current of the transistor being greater than the bias current.

2. The overvoltage protection circuit of claim 1, further comprising:
    a reference voltage generator configured to generate a reference voltage, the transistor configured to activate based on the voltage associated with the data terminal being greater than a combination of the reference voltage and a threshold voltage of the transistor.

3. The overvoltage protection circuit of claim 1, further comprising:
    a clamp circuit configured to receive the voltage associated with the data terminal,
    in response to the voltage being greater than an upper threshold, the clamp circuit configured to clamp the voltage to the upper threshold.

4. The overvoltage protection circuit of claim 1, further comprising:
    a clamp circuit configured to receive the voltage associated with the data terminal,
    in response to the voltage being lower than a lower threshold, the clamp circuit configured to clamp the voltage to the lower threshold.

5. The overvoltage protection circuit of claim 1, wherein the transistor is a first transistor, the current comparator including a second transistor and an output node disposed between the first transistor and the second transistor, wherein a voltage is generated at the output node in response to a current of the first transistor being greater than a current of the second transistor, the current of the second transistor being the bias current.

6. The overvoltage protection circuit of claim 5, wherein the first transistor is a P-channel transistor, and the second transistor is an N-channel transistor.

7. The overvoltage protection circuit of claim 5, wherein the output node is connected to the output circuit.

8. The overvoltage protection circuit of claim 1, wherein the transistor has a first terminal configured to receive a reference voltage, a second terminal configured to receive an output of a clamp circuit, and a third terminal connected to a current mirror that mirrors the bias current.

9. The overvoltage protection circuit of claim 1, wherein the output circuit includes a first inverter and a second inverter.

10. A universal serial bus (USB) connector, comprising:
a data terminal;
a switch coupled to the data terminal, the switch configured to be coupled to a device, the data terminal configured to be electrically connected to the device in response to the switch being closed, the data terminal configured to be electrically disconnected from the device in response to the switch being open; and
an overvoltage protection circuit connected to the switch, the overvoltage protection circuit configured to generate an overvoltage protection signal in response to an overvoltage event on the data terminal, the switch configured to open in response to the overvoltage protection signal,
the overvoltage protection circuit including a bias current generator configured to generate a bias current, and a current comparator, the current comparator including a transistor, the overvoltage protection circuit configured to generate the overvoltage protection signal in response to a current of the transistor being greater than the bias current.

11. The USB connector of claim 10, wherein the overvoltage protection circuit includes:
a reference voltage generator configured to generate a reference voltage, the transistor configured to activate based on the voltage associated with the data terminal being greater than a combination of the reference voltage and a voltage threshold of the transistor.

12. The USB connector of claim 10, wherein the overvoltage protection circuit includes:
a clamp circuit configured to receive a voltage associated with the data terminal,
in response to the voltage being greater than an upper threshold, the clamp circuit configured to clamp the voltage to the upper threshold.

13. The USB connector of claim 12, wherein the clamp circuit includes a first diode and a second diode.

14. The USB connector of claim 10, wherein the overvoltage protection circuit includes:
a clamp circuit configured to receive a voltage associated with the data terminal,
in response to the voltage being lower than a lower threshold, the clamp circuit configured to clamp the voltage to the lower threshold.

15. The USB connector of claim 10, wherein the transistor is a first transistor, the current comparator including a second transistor and an output node disposed between the first transistor and the second transistor, wherein a voltage is generated at the output node in response to a current of the first transistor being greater than a current of the second transistor, the current of the second transistor being the bias current.

16. The USB connector of claim 15, wherein the first transistor has a gate configured to receive a reference voltage, a source configured to receive the voltage associated with the data terminal, and a drain connected to a drain of the second transistor.

17. A method for overvoltage protection in a universal serial bus (USB) connector, the method comprising:
clamping a voltage of a data terminal of the USB connector;
activating a first transistor of a current comparator based on the clamped voltage;
comparing a current of the first transistor with a current of a second transistor of the current comparator; and
generating an overvoltage protection signal in response to the current of the first transistor being greater than the current of the second transistor; and
deactivating a USB switch based on the overvoltage protection signal.

18. The method of claim 17, further comprising:
generating a reference voltage,
wherein the activating includes activating the first transistor in response to the clamped voltage being greater than a combination of the reference voltage and a voltage threshold of the first transistor.

19. The method of claim 17, further comprising:
generating a bias current; and
mirroring the bias current with the second transistor.

20. The method of claim 17, wherein the comparing includes:
generating a voltage at an output node disposed between the first transistor and the second transistor in the response to the current of the first transistor being greater than the current of the second transistor; and
generating the overvoltage protection signal based on the voltage at the output node.

* * * * *